Figure 3:
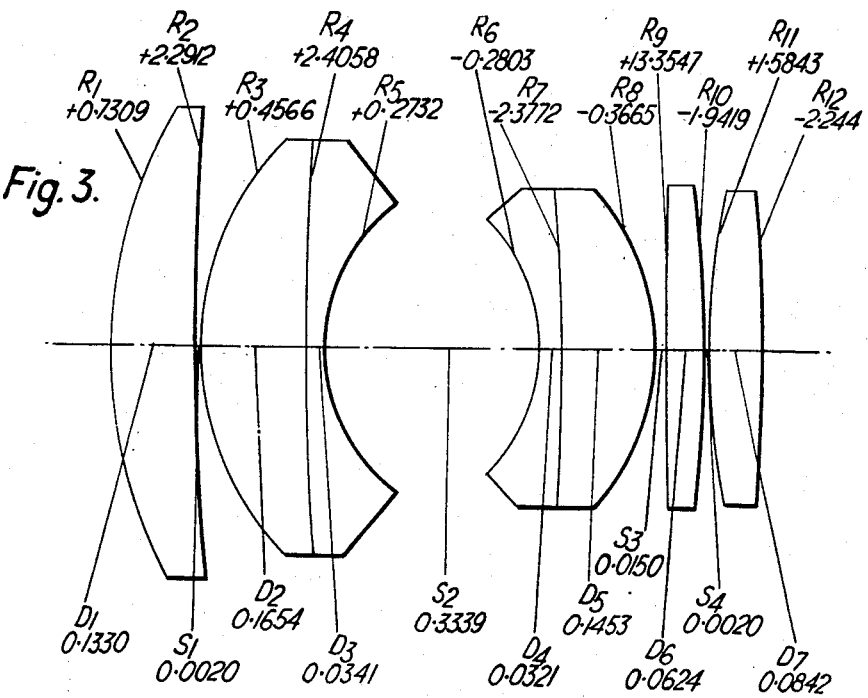
Figure 4:
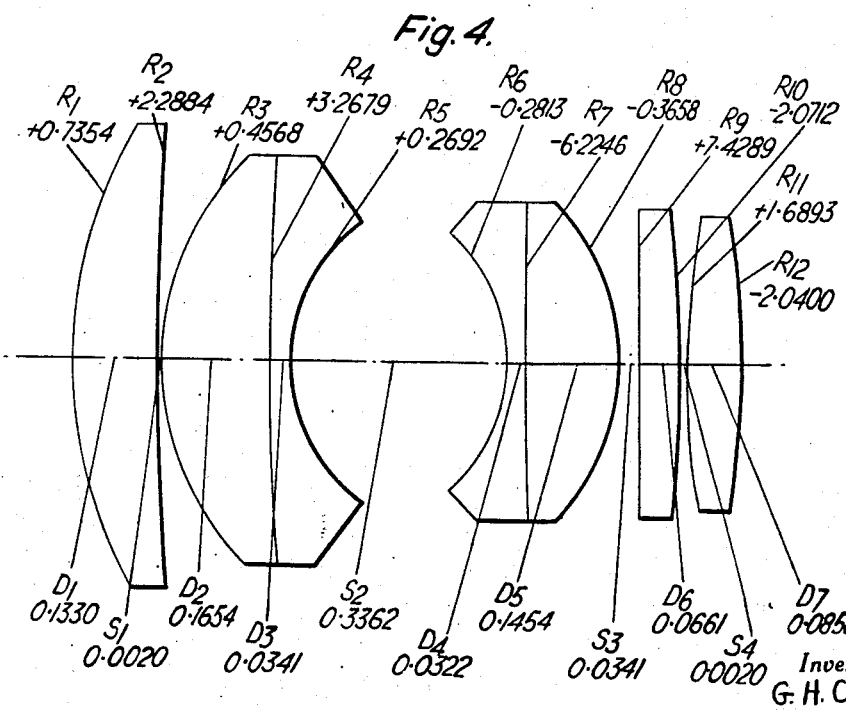

Nov. 8, 1960 G. H. COOK 2,959,104
OPTICAL OBJECTIVES
Filed June 2, 1958 2 Sheets—Sheet 1
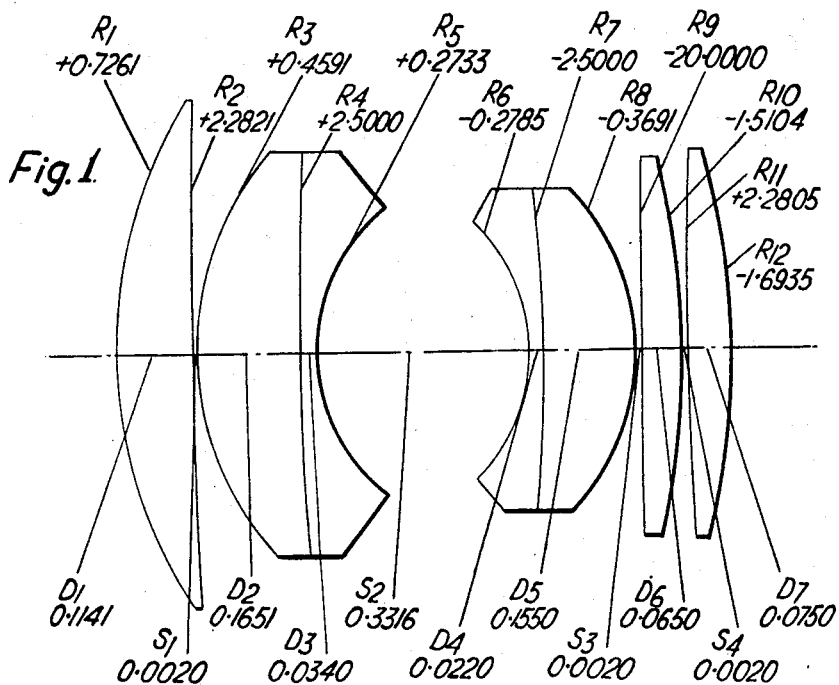
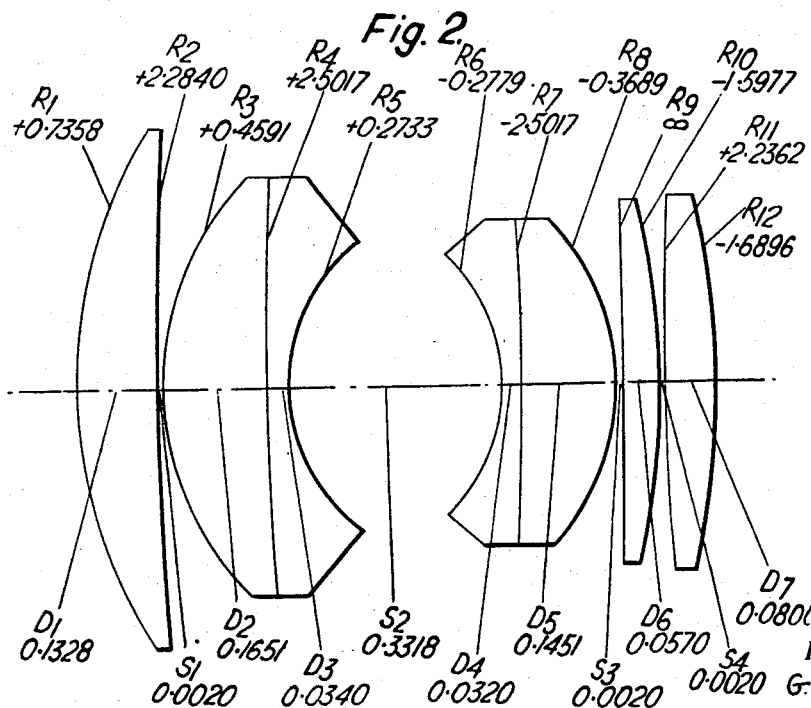
Inventor
G. H. Cook Inventor
G. H. Cook United States Patent Office 2,959,104
Patented Nov. 8, 1960

2,959,104
OPTICAL OBJECTIVES

Gordon Henry Cook, Leicester, England, assignor to Taylor, Taylor & Hobson Limited, Leicester, England, a British company Filed June 2, 1958, Ser. No. 739,410

Claims priority, application Great Britain Aug. 16, 1957

10 Claims. (Cl. 88—57)

This invention relates to an optical objective, more especially although not exclusively for photographic purposes, of the kind corrected for spherical and chromatic aberrations, coma, astigmatism, field curvature and distortion, and having five components comprising a simple collective front component, two simple collective rear components, and between the front component and such rear components two compound meniscus components having their air-exposed surfaces concave to a diaphragm in the air space between them. It is to be understood that the terms "front" and "rear" are used herein in their usual significance to refer to the sides of the objective respectively nearer to and further from the longer conjugate, so that, when the objective is used for photographic purposes, the light passes through it from front to rear.

The present applicant's copending United States of America patent application Serial No. 700,145 is concerned with an improved objective of this kind having a moderate back focal distance and giving a high degree of correction both for zonal spherical aberration and for the oblique aberrations over a wide angle of view for a medium or high relative aperture, say between F/1.8 and F/3.0, whilst maintaining a high degree of correction for the primary aberrations. In such objective, the numerical sum of the radii of curvature of the rear surface of the front compound meniscus component and the front surface of the rear compound meniscus component lies between 1.33 and 2.33 times the axial length of the air space between such surfaces, whilst the axial thickness of the front compound meniscus component lies between 0.1 F and 0.16 F and the axial thickness of the rear compound meniscus component lies between 0.08 F and 0.14 F, where F is the equivalent focal length of the whole objective.

The present applicant's United States of America patent application Serial No. 726,505 also relates to an objective of the above-mentioned general kind but having long back focal distance and wherein a high degree of correction both for primary and for higher order aberrations, especially zonal spherical aberration, is achieved for a high relative aperture, say of the order of F/1.4. In such objective, the numericaal sum of the radii of curvature of the rear surface of the front compound meniscus component and the front surface of the rear compound meniscus component lies between 1.33 and 2.33 times the axial length of the air space between such surfaces, whilst the sum of the equivalent powers of the two compound meniscus components lies between $-0.7/F$ and $-1.1/F$, where F is the equivalent focal length of the objective and the negative sign indicates dispersive power, the optical power of the rear surface of the rear compound meniscus component lies between 2 and 7 times the reciprocal of the sum of the equivalent focal lengths of the two simple collective rear components. It is to be understood that the optical power of a surface is the quantity defined mathematically by the expression $(n^1-n)/R$, where $n$ and $n^1$ are the mean refractive indices of the materials respectively in front of and behind the surface and R is the radius of curvature of the surface regarded as positive if the surface is convex to the front and negative if the surface is concave to the front, the power being collective or dispersive in accordance with whether such mathematical expression is positive or negative.

The present invention has for its object to provide a further objective of the above-mentioned general kind for purposes not requiring a long back focal distance but wherein again the higher relative aperture of the order of F/1.4 is achieved, such objective having in this case a considerably improved correction for distortion and for axial and oblique aberrations and a greater freedom from vignetting. Such improved objective is suitable for use for t⁻levision photography and for other purposes, for which hitherto inferior objectives of other types have usually been employed.

In the objective according to the present invention, the two compound meniscus components are in the form of doublets with all their surfaces (including the internal contact surfaces) concave towards the diaphragm in the air space between them, the numerical sum of the radii of curvature of the two surfaces bounding such air space lying between 1.33 and 2.0 times the axial length of such air space, whilst the radii of curvature of the internal contact surfaces in the front and rear doublet meniscus components respectively lie numerically between F and 4.33 F and between F and 10.0 F, where F is the equivalent focal length of the whole objective, the optical power of the rear surface of the rear doublet meniscus component lying between 5 and 10 times the reciprocal of the sum of the equivalent focal lengths of the two simple collective rear components, the mean refractive index of the material of the rear element of the front doublet meniscus component being less than that of the front element of such component by an amount lying between 0.05 and 0.13 and also being less than the arithmetic mean of the mean refractive indices of the materials of the front elements of the two doub'et meniscus components, whilst the mean refractive indices of the materials of the two elements of the rear doublet meniscus component differ from one another by less than 0.04. In such objective, the unusually small radii of the surfaces bounding the diaphragm air space in conjunction with such relatively small air space, are important in the achievement of reduced vignetting without substantial loss of aberration correction, the radii of the internal contact surfaces of the doublet components also being indirectly important in this connection, whilst the high power of the rear surface of the rear doublet component in relation to the sum of the equivalent focal lengths of the two simple collective rear components is important in improving the correction of distortion and axial and zonal aberrations and the choice of materials for the elements of the doublet components is important in the correction of oblique aberrations. To assist in achieving good correction for distortion, the combined equivalent power of the front three components preferably lies between $0.2/F$ and $0.5/F$.

Preferably, in order to assist in achieving good correction for distortion, astigmatism and higher order aberrations, the equivalent focal length of the simple collective front component lies between 1.33 F and 2.0 F and also between 0.44 and 1.33 times the radius of curvature of the rear surface of such component, such surface being convex to the front, and the equivalent focal length of the simple collective fourth component lies between 1.0 and 3.0 times that of the simple collective rear component, the sum of the equivalent focal lengths of such two simple rear components lying between 2.33 F and 5.5 F.

For assisting in the correction of the aberrations, and more especially zonal aberrations and astigmatism, it is preferable for the radius of curvature of the rear surface of the rear doublet meniscus component to lie numerically between 0.3 F and 0.6 F, and for the radii of curvature of the rear surfaces of the two simple rear collective components each to lie numerically between F and 3 F, such surfaces being concave to the front, the front surface of the simple collective rear component being convex to the front with radius of curvature between F and 3.5 F, whilst the front surface of the simple collective fourth component has relatively large radius of curvature, such radius being numerically greater than 4 F both if the surface is concave to the front and if the surface is convex to the front.

The two doublet meniscus components are preferably dispersive, the sum of their equivalent powers lying numerically between 0.25/F and 0.66/F and the axial thicknesses of such components each lying between 0.14 F and 0.24 F, whilst the optical power of the front surface of the front doublet meniscus component lies between 2.0 and 3.0 times the equivalent power of the simple collective front component.

For the further avoidance of vignetting, it is convenient to make the clear apertures of the front surface of the front doublet meniscus component and the rear surface of the rear doublet meniscus component the limiting apertures for oblique pencils. In conjunction with this, it is preferable for the optical power of the front surface of the rear doublet meniscus component to lie numerically between 2.1/F and 2.9/F, or between 1.5/F times the F-number of the objective and 2.1/F times such F-number. Conveniently, further assistance in maintaining good correction for field curvature can be derived from suitable choice of the materials used for the various elements of the objective as a whole. Thus, conveniently, the doublet meniscus components each consist of a collective element and a dispersive element, and the average value of the mean refractive indices of the materials of the five collective elements preferably exceeds the average value of the mean refractive indices of the materials of the two dispersive elements by less than 0.08. The Abbé V numbers of the materials used for the various elements are important in maintaining correction for chromatic aberrations. Preferably, the average value of the Abbé V numbers of the materials of the five collective elements exceeds the average value of the Abbé V numbers of the materials of the two dispersive elements by an amount lying between 15.0 and 27.0.

Numerical data for four convenient practical Examples I–IV of objectives according to the invention are given in the following tables, Figs. I–IV of the accompanying drawings corresponding to Examples I–IV. In the tables, $R_1$, $R_2$ . . . represent the radii of curvature of the individual surfaces (the positive sign indicating that the surface is convex to the front and the negative sign that it is concave thereto), $D_1$, $D_2$ . . . represent the axial thicknesses of the elements, and $S_1$, $S_2$ . . . represent the axial air separations between components. The tables also give the mean refractive indices $n_d$ for the $d$-line and the Abbé V numbers of the materials used for the elements of the objectives.

The insertion of equals (=) signs in the radius columns of the tables, in company with plus (+) and minus (−) signs which indicate whether the surface is convex or concave to the front, is for conformity with the usual Patent Office custom, and it is to be understood that these signs are not to be interpreted wholly in their mathematical significance. This sign convention agrees with the mathematical sign convention required for the computation of some of the aberrations including the primary aberrations, but different mathematical sign conventions are required for other purposes including computation of some of the secondary aberrations, so that a radius indicated for example as positive in the tables may have to be treated as negative for some calculations as is well understood in the art.

Example I

[Equivalent focal length 1.000. Relative aperture F/1.4]

| Radius | Thickness or Air Separation | Refractive Index $n_d$ | Abbé V Number |
|---|---|---|---|
| $R_1 = + 0.7261$ | | | |
| | $D_1 = 0.1141$ | 1.65100 | 58.60 |
| $R_2 = + 2.2821$ | | | |
| | $S_1 = 0.0020$ | | |
| $R_3 = + 0.4591$ | | | |
| | $D_2 = 0.1651$ | 1.69680 | 55.61 |
| $R_4 = + 2.5000$ | | | |
| | $D_3 = 0.0340$ | 1.60545 | 38.03 |
| $R_5 = + 0.2733$ | | | |
| | $S_2 = 0.3316$ | | |
| $R_6 = - 0.2785$ | | | |
| | $D_4 = 0.0220$ | 1.70035 | 30.28 |
| $R_7 = - 2.5000$ | | | |
| | $D_5 = 0.1550$ | 1.69680 | 55.61 |
| $R_8 = - 0.3691$ | | | |
| | $S_3 = 0.0020$ | | |
| $R_9 = -20.0000$ | | | |
| | $D_6 = 0.0650$ | 1.69350 | 53.51 |
| $R_{10} = - 1.5104$ | | | |
| | $S_4 = 0.0020$ | | |
| $R_{11} = + 2.2805$ | | | |
| | $D_7 = 0.0750$ | 1.69350 | 53.51 |
| $R_{12} = - 1.6935$ | | | |

Example II

[Equivalent focal length 1.000. Relative aperture F/1.4]

| Radius | Thickness or Air Separation | Refractive Index $n_d$ | Abbé V Number |
|---|---|---|---|
| $R_1 = +0.7358$ | | | |
| | $D_1 = 0.1328$ | 1.65145 | 58.48 |
| $R_2 = +2.2840$ | | | |
| | $S_1 = 0.0020$ | | |
| $R_3 = +0.4591$ | | | |
| | $D_2 = 0.1651$ | 1.69778 | 55.64 |
| $R_4 = +2.5017$ | | | |
| | $D_3 = 0.0340$ | 1.60520 | 37.99 |
| $R_5 = +0.2733$ | | | |
| | $S_2 = 0.3318$ | | |
| $R_6 = -0.2779$ | | | |
| | $D_4 = 0.0320$ | 1.70048 | 30.28 |
| $R_7 = -2.5017$ | | | |
| | $D_5 = 0.1451$ | 1.69778 | 55.64 |
| $R_8 = -0.3689$ | | | |
| | $S_3 = 0.0020$ | | |
| $R_9 = \infty$ | | | |
| | $D_6 = 0.0570$ | 1.69355 | 53.58 |
| $R_{10} = -1.5977$ | | | |
| | $S_4 = 0.0020$ | | |
| $R_{11} = +2.2362$ | | | |
| | $D_7 = 0.0800$ | 1.69355 | 53.58 |
| $R_{12} = -1.6896$ | | | |

Example III

[Equivalent focal length 1.000. Relative aperture F/1.4]

| Radius | Thickness or Air Separation | Refractive Index $n_d$ | Abbé V Number |
|---|---|---|---|
| $R_1 = + 0.7309$ | | | |
| | $D_1 = 0.1330$ | 1.65072 | 58.65 |
| $R_2 = + 2.2912$ | | | |
| | $S_1 = 0.0020$ | | |
| $R_3 = + 0.4566$ | | | |
| | $D_2 = 0.1654$ | 1.69805 | 55.65 |
| $R_4 = + 2.4058$ | | | |
| | $D_3 = 0.0341$ | 1.60507 | 37.99 |
| $R_5 = + 0.2732$ | | | |
| | $S_2 = 0.3339$ | | |
| $R_6 = - 0.2803$ | | | |
| | $D_4 = 0.0321$ | 1.70059 | 30.27 |
| $R_7 = - 2.3772$ | | | |
| | $D_5 = 0.1453$ | 1.69109 | 54.66 |
| $R_8 = - 0.3665$ | | | |
| | $S_3 = 0.0150$ | | |
| $R_9 = +13.3547$ | | | |
| | $D_6 = 0.0624$ | 1.69109 | 54.66 |
| $R_{10} = - 1.9419$ | | | |
| | $S_4 = 0.0020$ | | |
| $R_{11} = + 1.5843$ | | | |
| | $D_7 = 0.0842$ | 1.69109 | 54.66 |
| $R_{12} = - 2.2244$ | | | |

Example IV

[Equivalent focal length 1.000. Relative aperture F/1.4]

| Radius | Thickness or Air Separation | Refractive Index $n_d$ | Abbé V Number |
|---|---|---|---|
| $R_1 = +0.7354$ | | | |
| | $D_1 = 0.1330$ | 1.65072 | 58.65 |
| $R_2 = +2.2884$ | | | |
| | $S_1 = 0.0020$ | | |
| $R_3 = +0.4568$ | | | |
| | $D_2 = 0.1654$ | 1.69109 | 54.66 |
| $R_4 = +3.2679$ | | | |
| | $D_3 = 0.0341$ | 1.60936 | 39.70 |
| $R_5 = +0.2692$ | | | |
| | $S_2 = 0.3362$ | | |
| $R_6 = -0.2813$ | | | |
| | $D_4 = 0.0322$ | 1.70059 | 30.27 |
| $R_7 = -6.2246$ | | | |
| | $D_5 = 0.1454$ | 1.69109 | 54.66 |
| $R_8 = -0.3658$ | | | |
| | $S_3 = 0.0341$ | | |
| $R_9 = +7.4289$ | | | |
| | $D_6 = 0.0661$ | 1.69109 | 54.66 |
| $R_{10} = -2.0712$ | | | |
| | $S_4 = 0.0020$ | | |
| $R_{11} = +1.6893$ | | | |
| | $D_7 = 0.0856$ | 1.69109 | 54.66 |
| $R_{12} = -2.0400$ | | | |

In each of the first two of these examples the objective is corrected over a semi-angular field of 15 degrees with respect to a diaphragm located centrally in the air space between the two doublet meniscus components, whilst in the third and fourth examples the objective is corrected respectively over a semi-angular field of 9 degrees and of 5.7 degrees with respect to a diaphragm located centrally in the air space between the two doublet components. The objective of the first example has a back focal distance of 0.576 F, that of the second example 0.568 F, that of the third example 0.541 F and that of the fourth example 0.561 F. The equivalent focal lengths of the five components, counting from the front, are respectively +1.590 F, −3.012 F, −7.660 F, +2.342 F and +1.412 F in the first example, and +1.611 F, −3.042 F, −7.603 F, +2.302 F and +1.398 F in the second example, the positive sign indicating collective power and the negative sign dispersive power. In the third and fourth examples the corresponding equivalent focal lengths are respectively +1.596 F, −3.139 F, −8.581 F, +2.457 F and +1.351 F and +1.611 F, −2.736 F, −9.450 F, +2.350 F and +1.350 F.

The numerical sum of the radii $R_5$ and $R_6$ is 0.552 F in the first example, which is 1.67 times the axial air space $S_2$, and 0.551 F in the second example, which is 1.66 times the axial air space $S_2$. In the third example the sum of the radii $R_5$ and $R_6$ is 0.553 F, which is 1.65 times $S_2$ whilst in the fourth example the sum of the corresponding radii is 0.550 F, which is 1.63 times $S_2$. In each case these two radii are unusually small for an objective of this type having so high a relative aperture, and in particular it is to be noted that the absolute value of the optical power of the surface $R_6$ is 2.515/F, in the first example or 1.79/F times the F-number of the objective and 2.521/F in the second example or 1.80/F times the F-number of the objective. In the third example the absolute value of the optical power of the surface $R_6$ is 2.499/F or 1.78 times the F-number of the objective whilst in the fourth example the corresponding absolute value of the optical power is 2.490/F or 1.78 times the F-number of the objective. It is usually desirable for this radius $R_6$ to lie numerically between 0.24 F and 0.34 F. The small values of these radii make it possible to make the axial air space $S_2$ relatively small, without sacrifice of aberration correction, and this in turn, with somewhat reduced axial thicknesses for the two doublet components, makes it possible to reduce materially the axial distance between the surfaces $R_3$ and $R_8$. These two surfaces $R_3$ and $R_8$ are arranged to have clear diameters bearing such relation to the diameters of the other surfaces that these two clear apertures act as limiting apertures for oblique pencils.

Thus in the first example the clear diameters of the five components, reading from front to rear are respectively 0.792 F, 0.630 F, 0.503 F, 0.579 F and 0.596 F, whilst the chamfer diameters of the surfaces $R_5$ and $R_6$ are respectively 0.443 F and 0.402 F. Again, in the second example, the corresponding clear diameters are 0.789 F, 0.634 F, 0.495 F, 0.565 F and 0.585 F, and the corresponding chamfer diameters are 0.441 F and 0.396 F. In the third example the corresponding clear diameters are 0.719 F, 0.633 F, 0.482 F, 0.493 F and 0.488 F and the corresponding chamfer diameters are 0.440 F and 0.389 F whilst in the fourth example the corresponding clear diameters are 0.716 F, 0.634 F, 0.497 F, 0.475 F and 0.457 F and the corresponding chamfer diameters are 0.439 F and 0.398 F. In this way, the reduced axial distance between the surfaces $R_3$ and $R_8$ makes it possible significantly to reduce vignetting without sacrificing correction of the other aberrations.

It will be appreciated, however, that the reduction in the axial distance between the surfaces $R_3$ and $R_8$, in conjunction with the depth of the surfaces $R_5$ and $R_6$ tends to introduce an undesirable amount of astigmatism and zonal aberrations. This is, however, overcome to a considerable degree by giving high optical power to the surfaces $R_3$ and $R_8$ more especially the latter. The optical power of the surface $R_8$ in relation to the sum of the equivalent focal lengths of the two simple collective rear components, is also important in improving correction of distortion and axial aberrations. Thus the optical power of the surface $R_8$ in the first example is 1.89/F or 7.1 times the reciprocal of the sum of the equivalent focal lengths of the two simple collective rear components such sum being 3.75 F. In the second example, the optical power of the surface $R_8$ is again 1.89/F, which is 7.0 times the reciprocal of the sum of the equivalent focal lengths of the two simple collective rear components, such sum being 3.70 F. The optical power of the surface $R_8$ in the third example also is 1.89/F which is 7.0 times the reciprocal of the sum of the equivalent focal lengths of the two simple collective rear components, such sum being 3.71 F, whilst the corresponding power in the fourth example is again 1.89/F, which is 7.0 times the reciprocal of the sum of the equivalent focal lengths of the two simple collective rear components, such sum being 3.70 F. The optical power of the surface $R_3$ is respectively 1.52/F, 1.52/F, 1.53/F and 1.51/F in the four examples so that in the first example such optical power is 2.42 times the equivalent power of the simple collective front component, in the second and third examples such optical power is 2.45 times such equivalent power and in the fourth example such optical power is 2.43 times such equivalent power.

Suitable choice of the glasses used for the elements of the two doublet components is also important, in conjunction with the features above mentioned, in respect of corrections for higher order aberrations, especially higher order coma. Thus the difference between the mean refractive indices of the materials of the two elements of the front meniscus doublet is 0.09 in each example, and the arithmetic mean of the mean refractive indices of the materials of the front elements of the two doublets is 1.70 in each example, which is considerably greater than the mean refractive index of the material of the rear element of the front meniscus doublet, whilst the means refractive indices of the two elements of the rear meniscus doublet differ from one another by only 0.0035 in the first example, by 0.0027 in the second example, and by 0.0095 in the third and fourth examples.

Further useful contributions towards the correction of distortion, astigmatism and the higher order aberrations are obtained from suitable choice of the equivalent focal lengths of the three simple components and of the radii of curvature of the surfaces thereof. In this connection, it is particularly to be noted that the equivalent focal length of the simple front component is approximately 0.7 times the radius $R_2$ in each example. The combined equivalent power of the front three components is $0.321/F$ in the first example, $0.316/F$ in the second example, $0.339/F$ in the third example and $0.304/F$ in the fourth example, and these high values are also important in improving correction for distortion.

Other useful features for the correction of the various aberrations reside in the choice of the equivalent powers and the axial thicknesses of the doublet components. Thus, the sum of the dispersive equivalent powers of these components is numerically equal to $0.463/F$ in the first example, to $0.460/F$ in the second example, to $0.435/F$ in the third example and to $0.471/F$ in the fourth example. The axial thicknesses of these two components have the approximate values $0.2 F$ and $0.18 F$ respectively in each example, and good field curvature correction can be obtained with these small axial thicknesses in conjunction with the use of high index materials for the five collective elements in the objective. Thus, in each of the first two examples, the average value of the mean refractive indices of the materials of the five collective elements is 1.687, whilst that for the two dispersive elements adjoining the central air space is 1.653. In the third example the average value of the mean refractive indices of the materials of the five collective elements is 1.684, that for the two dispersive elements being 1.653, whilst in the fourth example the corresponding average values are respectively 1.683 and 1.655.

It may be mentioned that reduced axial thicknesses of the doublet components give rise to a difficulty in obtaining practicable axial thicknesses for the dispersive elements and edge thicknesses for the collective elements. This difficulty is however overcome by the increase in the curvature of the internal contact surfaces, and in order to maintain good correction for the chromatic aberrations with such increased curvature, it is preferable for the Abbé V numbers of the materials of the collective elements to be considerably greater than those of the dispersive elements. In the first example, the average value of the Abbé V numbers of the materials of the five collective elements is 55.37, whilst that for the two dispersive elements is 34.15. In the second example, the average value of the Abbé V numbers of the materials of the five collective elements is 55.38, whilst that for the two dispersive elements is 34.14. In the third example the average value of the Abbé V numbers of the materials of the five collective elements is 55.66, that of the two dispersive elements being 34.13, whilst the corresponding average values in the fourth example are respectively 55.46 and 34.98.

It should be made clear that in each of Examples III and IV, wherein the objective is corrected over a smaller semi-angular field than the objective in either of Examples I and II it is possible to achieve an even better correction for axial aberrations whilst at the same time maintaining the good correction for oblique aberrations and the freedom from vignetting over the smaller semi-angular field. For this purpose, the axial air separation $S_3$ is larger in each of the two last examples than in either of the first two examples and furthermore, the surface $R_9$ is made convex to the front in the two last examples.

What I claim as my invention and desire to secure by Letters Patent is:

1. An optical objective corrected for spherical and chromatic aberrations, coma, astigmatism, field curvature and distortion, comprising a simple collective front component, two simple collective rear components and between such front component and such rear components, two doublet meniscus components having all their surfaces, including the internal contact surfaces, concave to the air space between such components the numerical sum of the radii of curvature of the two surfaces bounding such air space lying between 1.33 and 2.0 times the axial length of such air space and the radii of curvature of the internal contact surfaces in the front and rear doublet meniscus components respectively lying numerically between F and 4.33 F and between F and 10.0 F, where F is the equivalent focal length of the whole objective, while the optical power of the front surface of the rear doublet meniscus component lies numerically between $2.1/F$ and $2.9/F$ and the optical power of the rear surface of such component lies between 5 and 10 times the reciprocal of the sum of the equivalent focal lengths of the two simple collective rear components, the two doublet meniscus components being dispersive and the sum of the equivalent powers of such doublet components lying between $0.25/F$ and $0.66/F$ while the combined equivalent power of the front three components lies between $0.2/F$ and $0.5/F$, and the mean refractive index of the material of the rear element of the front doublet meniscus component being less than that of the front element of such component by an amount lying between 0.05 and 0.13 and also being less than the arithmetic means of the refractive indices of the materials of the front elements of the two doublet meniscus components, while the mean refractive indices of the materials of the two elements of the rear doublet meniscus component differ from one another by less than 0.04.

2. An optical objective as claimed in claim 1, in which the doublet components each consist of a collective element and a dispersive element, and the average value of the mean refractive indices of the materials of the five collective elements of the objective exceeds the average value of the mean refractive indices of the materials of the two dispersive elements by less than 0.08.

3. An optical objective as claimed in claim 2, in which the average value of the Abbé V numbers of the materials of the five collective elements exceeds the average value of the Abbé V numbers of the materials of the two dispersive elements by an amount lying between 15.0 and 27.0.

4. An optical objective as claimed in claim 1, in which the optical power of the front surface of the front doublet component lies between 2.0 and 3.0 times the equivalent power of the simple collective front component, the axial thicknesses of the two doublet meniscus components each lying between $0.14 F$ and $0.24 F$.

5. An optical objective as claimed in claim 1, in which the clear apertures of the front surface of the front meniscus doublet component and the rear surface of the rear meniscus doublet component are made the limiting apertures for oblique pencils.

6. An optical objective as claimed in claim 5, in which the optical power of the front surface of the front doublet component lies between 2.0 and 3.0 times the equivalent power of the simple collective front component, the axial thicknesses of the two doublet meniscus components each lying between $0.14 F$ and $0.24 F$.

7. An optical objective as claimed in claim 1, in which the equivalent focal length of the simple collective front component lies between $1.33 F$ and $2.0 F$ and also between 0.44 and 1.33 times the radius of curvature of the rear surface of such component, such surface being convex to the front, and the equivalent focal length of the simple collective fourth component lies between 1.0 and 3.0 times that of the simple collective rear component, the sum of the equivalent focal lengths of such two simple rear components lying between $2.33 F$ and $5.5 F$.

8. An optical objective as claimed in claim 7 in which the optical power of the front surface of the front doublet component lies between 2.0 and 3.0 times the equivalent power of the simple collective front component, the axial thicknesses of the two doublet meniscus components each lying between $0.14 F$ and $0.24 F$.

9. An optical objective as claimed in claim 1, in which the radius of curvature of the rear surface of the rear doublet meniscus component lies numerically between $0.3 F$ and $0.6 F$, and the radii of curvature of the rear surfaces of the two simple rear collective components each lie numerically between F and 3 F, such surfaces being concave to the front, the front surface of the simple collective rear component being convex to the front with radius of curvature between F and 3.5 F, whilst the front surface of the simple collective fourth component is approximately flat, having a radius of curvature greater numerically than 4 F.

10. An optical objective as claimed in claim 9, in which the equivalent focal length of the simple collective front component lies between 1.33 F and 2.0 F and also between 0.44 and 1.33 times the radius of curvature of the rear surface of such component, such surface being convex to the front, and the equivalent focal length of the simple collective fourth component lies between 1.0 and 3.0 times that of the simple collective rear component, the sum of the equivalent focal lengths of such two simple rear components lying between 2.33 F and 5.5 F.

References Cited in the file of this patent

UNITED STATES PATENTS

| | | |
|---|---|---|
| 2,379,393 | Wynne | June 26, 1945 |
| 2,532,751 | Baker | Dec. 5, 1950 |
| 2,687,063 | Coleman | Aug. 24, 1954 |
| 2,735,339 | Doi | Feb. 21, 1956 |
| 2,831,397 | Berger et al. | Apr. 22, 1958 |

FOREIGN PATENTS

| | | |
|---|---|---|
| 804,143 | France | July 27, 1936 |